July 11, 1939.　　　T. S. SAFFORD　　　2,165,817
BRAKING SYSTEM
Filed June 12, 1933　　　3 Sheets-Sheet 1
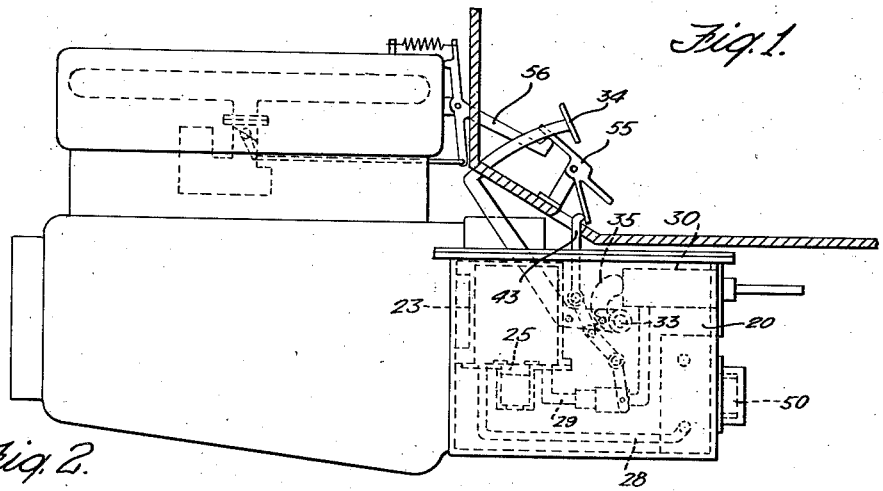
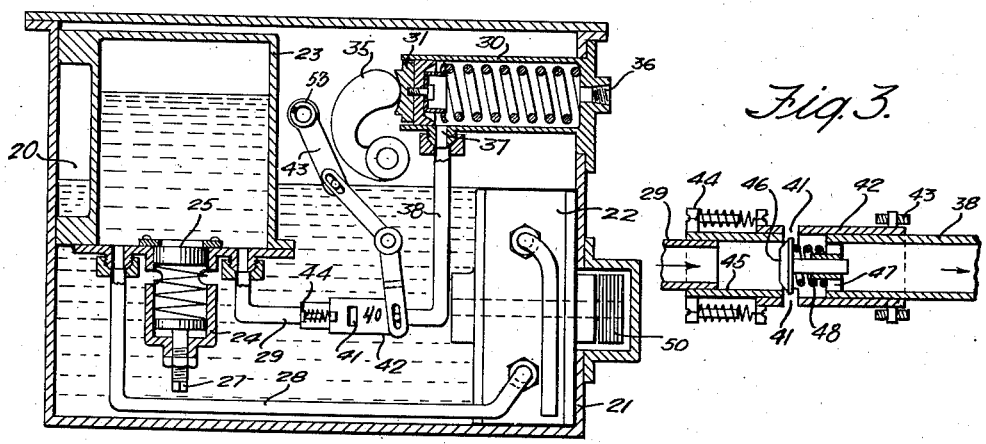
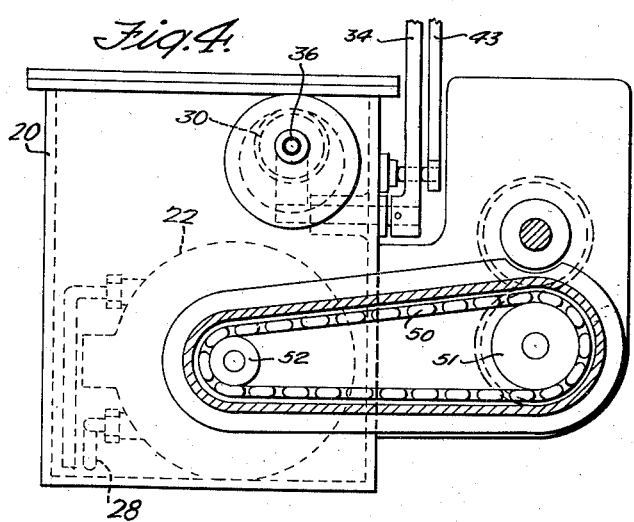
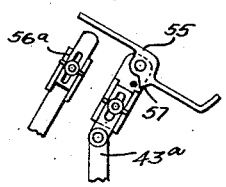
INVENTOR July 11, 1939.   T. S. SAFFORD   2,165,817
BRAKING SYSTEM
Filed June 12, 1933   3 Sheets-Sheet 2
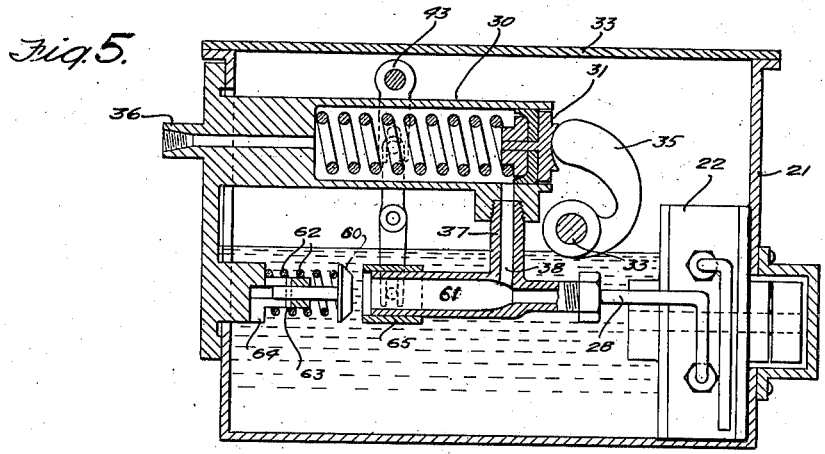
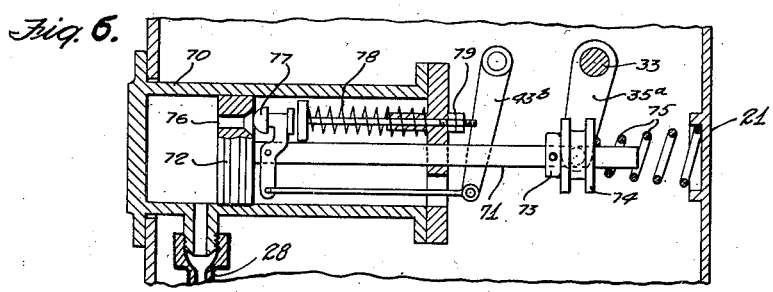
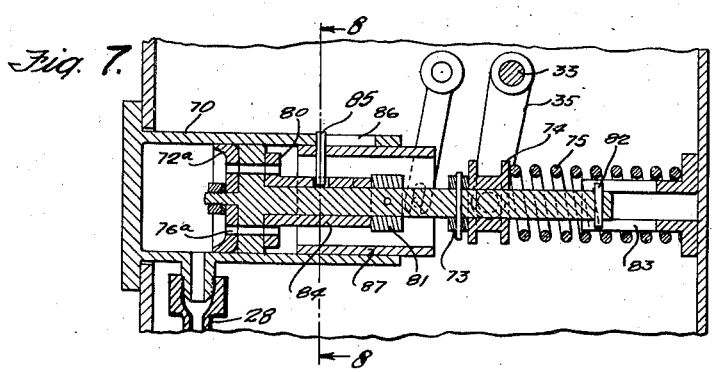
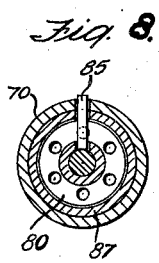
INVENTOR July 11, 1939.   T. S. SAFFORD   2,165,817
BRAKING SYSTEM
Filed June 12, 1933   3 Sheets-Sheet 3
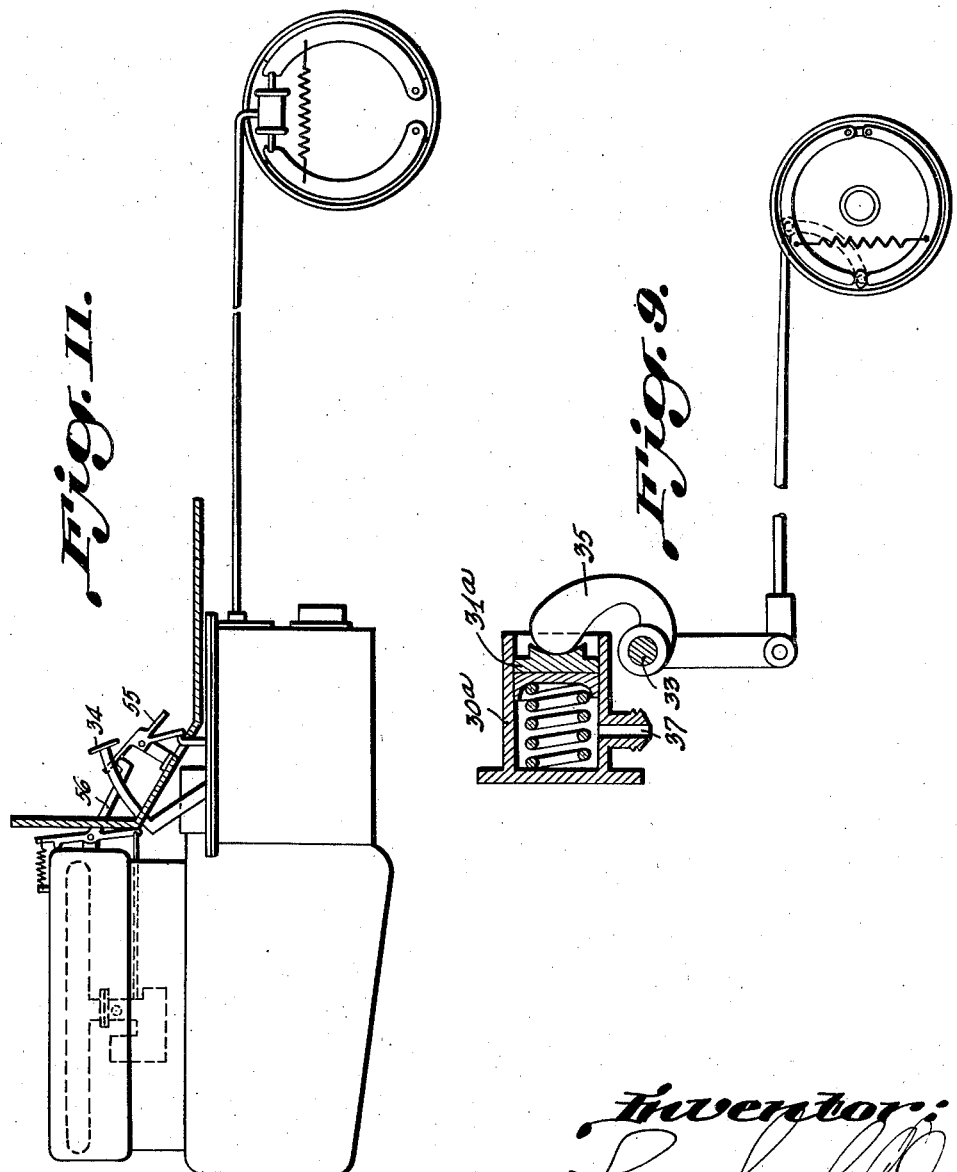

Patented July 11, 1939

2,165,817

UNITED STATES PATENT OFFICE 2,165,817

BRAKING SYSTEM

Truman Sunderland Safford, Port Chester, N. Y.

Application June 12, 1933, Serial No. 675,374

10 Claims. (Cl. 192—3)

This invention relates to a vehicle braking device and control means therefor. More particularly the invention relates to devices adapted when used in vehicle braking systems to make possible the complete control of the vehicle from a single accelerator pedal with a small amplitude of movement and requiring only relatively slight effort to operate.

It is an object of my invention to provide power braking which can be controlled at the accelerator pedal without shifting of the foot from the position in which it is used to control the accelerator whereby a car can be brought to a stop from high speeds with a minimum delay and a maximum efficiency and consequently in a much shorter distance than would be possible with either manual or power braking as known prior to my invention.

Another object of my invention is to provide power braking operable by substantially the same motions as are already used by drivers in slowing down by means of the drag of the motor, and which will leave the manual operation of the brakes unaffected so that there can be no confusion of drivers who are unfamiliar with the power braking system and the car will be at all times capable of stopping in the usual way exactly as tho it were equipped with brakes standard at the time of my invention.

Another object of the invention is to avoid skidding and increase the efficiency of braking by making maximum braking pressure dependent upon continued rotation of the wheels.

Another object of the invention is to provide a power braking device which will be simpler, less expensive, less subject to wear, substantially fool proof and capable of application to standard braking systems with a minimum change.

I am aware that power braking of automobiles has been considerably developed prior to my invention, but with few exceptions the power braking systems which have come into practical use have been of the "booster" type, that is power devices applied to and controlled by the standard brake linkage so that pressure upon the brake pedal first actuates the power control to move the brake just a little ahead of the position which is given to the brake pedal. So long as the power device operates properly it will keep the brakes always just ahead of the brake pedal, but if the power device should fail for any reason continued pressure will be applied directly to the brake linkage to effect manual operation thereof. These boosters lessen the force which is necessary to apply the brakes, but they do not change the movement of the legs. Driving in heavy traffic the legs are worn out with moving back and forth from accelerator pedal to brake pedal and vice versa and up and down on the brake pedal, even if the force required on the brake pedal is negligible. In an emergency stop from high speeds there is still the same delay in transferring the foot from the accelerator pedal to the brake pedal during which the car may travel as much as thirty to fifty feet, and which may therefore make the difference between safety and death or serious injury.

I am aware also that brakes have been designed prior to my invention so that maximum braking is dependent upon continued rotation of the wheels. Thus for example the reaction or drag of a pilot brake has been used to apply the principal brakes, so that as soon as rotation of the wheels stops the force by which the brakes are applied also ceases. In one such brake which has gone into commercial use the system has been treated strictly as a power brake rather than as a booster, and has been controlled by a pedal beside and identical with the accelerator pedal. Altho this arrangement was a substantial advance in convenience, it involves the very serious danger that the two identical pedals may become confused in an emergency and the car be urged ahead when it was intended to stop, or the car be stopped when it was intended to urge it ahead.

When fluid pressure has been used in power braking it has, for the most part, been controlled by valves subjected to the pressure so that a force is required to operate the valve which is more or less proportional to that which becomes effective on the brakes. It has been suggested to control such pressure by a valve which, when adjusted to a given position would maintain a given pressure, regardless of the force applied, but no simple construction capable of achieving this end had been conceived prior to my invention; and no one had appreciated or realized the improvements which such a valve makes possible in power braking with fluid pressure.

Prior to my invention no simple brake device has been known which was capable of operation with so little effort as the brake which is described herein, and controlled by the accelerator pedal so that the natural movement for slowing down, i. e., lifting the toe end of the accelerator pedal, is made to effect braking.

Power braking mechanism as known prior to my invention have been complex and expensive and requiring frequent adjustment and/or replacements. In contrast to these, the devices of the present invention may be applied to standard manual braking systems without other change than the addition of a few simple parts which operate substantially without wear or need for adjustment.

In the accompanying drawings I have illustrated several embodiments of the invention. These are chosen for purposes of explaining the principle and practical construction of the invention and are not to be taken in any sense as limiting, or as an exhaustive showing. It should be understood furthermore that the proportions of various parts have been distorted to some extent in these drawings in order to make them easier to read. The proportions however are mere matters of engineering which will be within the skill of those skilled in the art, particularly when it is remembered that these parts are mostly standard in braking systems in common use.

Figure 1 is a side elevation of an automobile power plant and transmission unit showing the relation of my invention thereto.

Figure 2 is a longitudinal vertical section taken thru the master control unit of the braking system as illustrated in Figure 1.

Figure 3 is a longitudinal section thru the brake control valve illustrated in Figure 2.

Figure 4 is an end elevation phantom view of the master control unit shown in Figures 1 and 2.

Figure 5 is a sectional view similar to Figure 2 of a modified form of the invention.

Figures 6 and 7 are fragmentary sectional views showing other modified forms of the invention.

Figure 8 is a cross section taken on line 8—8 of Figure 7.

Figure 9 is a fragmentary sectional view of another modified form of the invention partly in elevation and partly in cross section, and shows the relationship between the brake operating cylinder and the wheels, the brake operating cylinder and a portion of the connected rod being shown on a larger scale than the remainder of the figure;

Figure 10 is a side elevation of an accelerator pedal arrangement which may be used in place of that shown in Figure 1; and Fig. 11 is a diagrammatic view showing the relation between the structure of Fig. 1 and the brake apparatus on the wheels, in which the brake apparatus on the wheels is shown on an enlarged scale as compared with the motor, etc.

Referring first to Figures 1 to 4 and 11, I have shown a power braking system which is adapted for use with standard hydraulic brakes. For convenience in showing, the parts of the master control unit 20 have been spread out much more than would be required in actual practice, and consequently the size of this unit is out of proportion to the size of the motor and transmission as shown.

This master control unit comprises a housing 21 which serves as a reservoir for the pressure transmitting fluid, a rotary pump 22, a pressure reservoir 23 having a pressure control valve 24, a master cylinder 30 and suitable connections including the control valve 40.

In the embodiment of the invention shown in these figures the pump 22 is driven from the jack shaft of the transmission, e. g. by a flexible belt 50 running over the pulleys or sprockets 51 and 52 on the jack shaft and pump respectively. This drive for the pump has been chosen merely as a convenient example, and is not to be taken as limiting, since obviously numerous other drives can be substituted without destroying the advantages of the invention.

I have chosen a rotary pump 22 for its simplicity, economy and freedom from wear, but here again any other type of pump may be substituted if desired.

The pressure reservoir 23 is merely an inverted drum in the top of which a quantity of air is trapped so that the liquid from the pump 22 may be accumulated against a head of compressed air at any desired pressure. The pressure is automatically maintained by the relief valve 24. When the predetermined pressure is exceeded, the piston 25 is driven down against the pressure of the spring 26 until the relief ports are uncovered, whereupon any further liquid forced into the reservoir from the pump will escape through these ports without causing increase of pressure.

The master cylinder 30 with its piston 31 and manual operating lever 35 connected to the standard brake pedal 34 by means of the shaft 33, may all be substantially the same as in the standard hydraulic brake systems already in use. The rest of the brake connections and mechanisms including the fluid pressure motors at the wheels shown diagrammatically in Fig. 11 to which the master cylinder is connected by the conduits 36 may also be the same as has been used in standard practice.

In the latest hydraulic brake systems a breather opening has been provided at 37 so that it is uncovered in the retracted position of the piston 31 but is cut off from the compression space of the cylinder 30 as soon as the piston is pressed a short distance into the cylinder. I have connected the conduit 38 to this opening and by means of the valve 40 have made it serve both as a breather and as an entrance for power developed pressure.

The valve 40 in normal position closes the conduit 29 leading from the pressure reservoir 23 and opens the master cylinder 30 thru the opening 37, the conduit 38 and the ports 41 so that all pressure in the brake line will be relieved and there will be no dragging of the brakes. In this position the outer slide 42 is pulled to the left by the decelerator lever 43 and a spring 53 which acts thereon. The slide 42 thru the spring 44 pulls the inner slide 45 against the face of the abutment member 46, thereby closing the end of the conduit 29; and while the inner slide is held by the abutment member the outer slide 42 is pulled a little farther until the ports 41 in both are aligned. The abutment member 46 is mounted in a spider 47 in the end of the conduit 38 and is held against the fluid pressure in the conduit 29 by the spring 48 which is designed to balance at each position of said member the force exerted thereon by the fluid pressure.

In the operation of this device, the rotation of the pump 22 forces liquid from the reservoir 21 into the pressure reservoir 23 until the pressure becomes high enough to effectively operate the braking system. The pressure control valve 24 automatically maintains a suitable pressure in the reservoir 23.

So long as the valve 40 remains in the condition illustrated in Figure 3 no liquid passes from the pressure reservoir 23 to the master cylinder 30, but as soon as heel pressure is applied to the accelerator pedal 55 so as to move the decelerator lever 43, the outer slide 42 is first allowed to shift relative to the inner slide 45 until the ports 41 are closed. Then the inner slide 45 is retracted from the abutment member 46 and due to the lesser pressure exerted by the spring 48 in its then less compressed position, pressure from the reservoir 23 escapes into the conduit 38 and thru it into the master cylinder 30 and the braking lines where it serves to apply the brakes. However, as soon as enough of the liquid has escaped into the conduit 38 to increase the pressure therein, it will be added to the pressure of the spring 48 and will eventually drive the abutment member 46 forward against the slide 45. Thus for any given position of the slide 42, and consequent compression of the spring 48, there is a definite pressure in the braking line which will be maintained. If for any reason the pressure should increase beyond this point it would drive the abutment member 46 farther and the slide 45 with it until the ports 41 would be opened a little and the excess pressure would thus escape.

If the brakes have been fully applied and it is desired to ease up on them a little without fully releasing them, the decelerator lever 43 is moved a little to the right until the ports 41 are opened a little. If the lever 43 is held in this position the release of pressure will increase the pressure difference to which the member 46 is subjected, whereupon the pressure of the spring 48 will no longer be balanced and will cause it to move toward the right. The spring 44 will cause the slide 45 to follow it so that no additional pressure escapes into the conduit 38; but as the slide 45 moves the ports 41 are again closed and thus the new lower pressure corresponding to the new position of the lever 43 is maintained.

Since the pressure of the fluid on the slide 45 is at all times substantially balanced, very little effort is required to adjust it, and this may be readily supplied by heel pressure on the accelerator pedal 55.

Thus the driving of the car requires simply a toe pressure on the pedal 55 to depress the accelerator lever 56, and heel pressure to shift the decelerator lever 43. It is never necessary to shift the foot from this pedal 55 to the pedal 34, but if one should thru habit or prejudice prefer to use the ordinary brake pedal 34, or if by any chance something should go wrong with the power system, the manual system is always ready to operate and is exactly the same system which prior to my invention has been accepted as standard on the best cars. There can never be any failure of braking because of failure of the operator to understand the power system.

In Figure 10 I have shown an alternative arrangement of the accelerator pedal. In this case it is pivoted directly upon the end of the decelerator lever 43a. The pivot of the lever 43a is forward of and below the pivot of the pedal 55 so that the weight of one's foot resting on the pedal or toe pressure on the pedal will tend to move the lever in the direction to release to brake. The shoulder 57 is made to engage a pin on the lever 43a so that heel pressure as well as a forward push on the pedal 55 will serve to apply the braking pressure. Both the lever 43a and the accelerator lever or rod 56a may be made adjustable in length to suit the comfort of each driver.

When the foot rests on the pedal 55, it pushes downward with a vertical force which passes some distance to the right of the pivot point. This results in a moment which acts in the clockwise or brake releasing direction. When, however, the operator pushes his foot against the bottom of the pedal, the force goes through the heel rest in such a direction as to be above the pivot point. This results in a moment which acts in a counterclockwise or brake applying direction.

In Figure 5 is shown another embodiment of the invention. In this case, instead of accumulating pressure in a reservoir, a stream of the liquid from the pump 22 is made to flow idly back into the reservoir or into the master cylinder 30 according to the adjustment of the valve 60. Whereas in the case illustrated in Figures 1 to 4 the pump 22 could be connected to any source of power, intermittent or continuous, in this case it is essential that the pump be running whenever braking is required. It is necessary therefore, that the pump in this case be connected to the wheels or transmission back of all clutches and free wheeling devices so that it will be positively driven from the wheels at all times.

The pump 22 may be exactly the same in this case as in the embodiment illustrated in Figures 2 and 3. Likewise the master cylinder 30, the pedal operated lever 35, the pedal 34, the connecting shaft 33, the accelerator pedal 55, and the decelerator lever 43. The valve 40, however, is in this case replaced by a by-pass valve which controls the idle escape of the liquid delivered from the pump 22 thru the conduit 28.

This valve comprises a movable abutment 60 urged toward the end of the conduit 61 by a spring 62. A pin 63 thru the stem of the abutment member 60 and positioned in the slot 64 serves as a stop to limit the movement of the abutment member so that when the slide 65 is withdrawn to the right there will be a substantial gap left for the escape of the liquid. This slot may also serve as an air vent to prevent compression of air behind the stem of the abutment member 60.

The slide 65 is fitted closely to the end of the conduit 61, and is adapted to be moved to the left from the position shown in Figure 5. The initial movement serves to close the gap between the slide and the abutment member 60. This results in the building up of fluid pressure in the conduit 61 until a pressure is reached which will push the member 60 back against the pressure of its spring 62. This pressure will be automatically maintained so long as the slide is not moved: as soon as the pressure increases, it will force back the member 60 and escape, and if the pressure decreases, it will allow the member 60 to come against the end of the conduit, or more strictly the slide 65, closing the gap and backing up the pressure from the pump 22. Since the pressure of the liquid is substantially balanced on the slide 65, it can be moved with very little effort just as in the case of the slide 42 already described in connection with Figure 3.

The conduit 61 may advantageously be a Venturi tube with the connection 38 entering the constricted throat. Thus so long as the liquid flows freely thru the conduit and back into the reservoir thru the gap left by the retraction of the sleeve 65, it will create a reduced pressure in the cylinder 30 and thereby prevent any dragging of the brakes. This Venturi tube should not of course be sufficient to result in sucking air into the braking line, but only enough to assure that there will be no dragging of brakes.

The closing of the gap by movement of the slide 65 as already described builds up pressure in the conduit 61 which passes over thru the connection 38 into the cylinder 30 and thence thru the braking lines to the brake operating motors at the wheels.

Manual braking is exactly the same as in Figures 1 to 4, and as described above can be effected at any time regardless of the condition of the power braking parts of the system. If the level of the liquid is kept high in the reservoir 21, the pump can be stopped completely without in any way affecting manual braking, and if the opening 37 is made at the top of the cylinder, instead of at the bottom as shown on the drawings to avoid confusion of parts, the entire reservoir, valve and pump could be broken away without affecting the manual braking.

The use of a rotary gear or eccentric pump is especially advantageous, for with no back check a slowing down of the wheels will result not only in a decrease of pressure generation but also, since such pumps necessarily have clearances through which fluids can leak, there will be a reduction of pressure in the brake line 37—30—36. Such pumps can maintain a given pressure only while turning at a given speed. Thus the maximum braking occurs at maximum speeds, where it is most needed, and any tendency of the wheels to slide will result in a decrease of the braking force and a consequent release of the wheels from their locked condition.

Altho all of the embodiments of the invention thus far described have been intended for use with standard hydraulic braking systems, the invention is also applicable to mechanical braking systems. For example as shown in Fig. 9, the conduit 36 from the master cylinder 30 of Fig. 3 or Fig. 5 may be connected to a fluid pressure motor to operate a mechanical linkage instead of to a plurality of such motors each operating the brake shoes at one wheel direct.

In Figure 6 I have shown another embodiment of the invention more particularly designed for use with mechanical braking systems. In this case the reservoir 21 and the pump 22 may be the same as in the examples already described. The conduit 28, however, is directly connected to the cylinder 70. The rod 71 of the piston 72 carries a collar 73 near its free end pinned or otherwise secured thereto. The collar 74 is slidably mounted on the free end of the rod 71 and bears on one side against the collar 73 and on the other side against the spring 75. The collar 74 engages the lever 35a so that a movement of the piston 72 toward the right will result in moving the lever 35a and thru it and the shaft 33 operating the mechanical brake linkage. The pedal 34 may be but need not be connected to the shaft 33 in fixed relationship as in the other figures and particularly need not be pulled down during power operation of the brakes.

When the brakes are manually operated by the pedal 34 the lever 35a will be swung to the right, but since the collar 74 is free on the shaft it will slide thereon without drag or interference from the piston.

The flow of liquid from the pump 22 is, during normal driving, allowed to escape thru an opening 76 in the piston. A valve 77 pivoted to the rod 71 as shown is provided to close the opening 76 when power braking is desired, and a spring 78 limited by the rod 79 is provided to balance the fluid pressure exerted on the valve. When the valve 77 is first closed there is no substantial pressure back of the piston and the valve may therefore be closed with little effort. The initial movement of the piston merely takes up play in the mechanical linkage, and when actual braking begins the increasing fluid pressure built up behind the piston insofar as it is exerted on the valve 77 is balanced by the spring 78. Preferably the spring is designed so that at every point it is just short of balancing the fluid pressure on the valve, so that it may be held closed by a slight pressure upon the lever 43b, but will be opened by the fluid pressure if it is released.

The movement of the piston 72 and therefore of the brake linkage is accurately controlled by the positioning of the decelerator lever 43b. When this lever is moved to the right it will close the opening 76 and the fluid collecting behind the piston will cause it to follow the movement of the lever 43b. So long as the lever 43b is moved to the right, the valve 77 will be held closed and the piston will continue to be moved by the accumulating fluid pressure. As soon as the lever 43b is held stationary, however, the piston will begin to move ahead of it and the valve 77 will be moved about its pivot to open the passage 76. This will allow the fluid to escape, and will relieve the pressure behind the piston until the piston drops back to an equilibrium position in which the valve 77 is open just enough to maintain the position of the piston. If the lever 43b is again moved to the right the valve is again closed and the piston also moves to the right. If the lever 43b is moved to the left the valve is opened and the piston recedes.

In Figures 7 and 8 is shown an embodiment of the invention similar to that of Figure 6 but having a different valve. The piston 72a in this case has a number of openings 76a therethru, but instead of the valve 77 a rotary valve member 80 is provided. This member 80 has openings adapted to register with those in the piston and may be turned so that the openings are closed. A collar 81 pinned or otherwise secured to the piston rod 71a holds the member 80 close against the rear face of the piston. A pin 82 in the free end of the piston rod rides in a slot in the bearing member 83 and keeps the piston from rotating. The collars 73 and 74 may be substantially the same as in Figure 6, and the spring 75a serves the same function as the spring 75.

The sleeve portion 84 of the valve member 80 is made with a spiral groove the sides of which engage the cam pin 85. This pin also slides in a longitudinal slot 86 e. g. in the wall of the cylinder 70 and is secured to a suitable operating member, in this case shown as a sleeve 87, which in turn is engaged by the decelerator lever 43a.

In normal operation with the brakes released the valve member is adjusted so as to bring the openings 76a into alignment and permit free escape of liquid from the cylinder behind the piston. When the brake is to be applied, the decelerator lever 43c is moved to the right, the pin 85 sliding in the spiral groove and held against angular movement by the straight groove 86 rotates the valve member 80 until the openings 76a are closed. Pressure then builds up back of the piston until it is moved to the right. As it is moved, however, the groove in the sleeve portion 84 slides along the pin 85 thereby rotating the valve member 80 back toward the open position. Thus as in the embodiment shown in Figure 6 the piston will reach an equilibrium position for each position of the decelerator lever.

Figure 9 illustrates one way in which the pump and pressure control devices of Figures 2 to 5 may be adapted to mechanical braking. In this case a simple fluid pressure motor is provided having a cylinder 30a and a piston 31a which drives the brake lever 35 connected to the brake linkage thru the shaft 33. This motor is connected to the conduit 38 of Figure 2, 3 or 5, and by fluid pressure admitted therethru into the cylinder 30a the piston 31a and the lever 35 are actuated.

I have shown these various forms of my invention to indicate the wide variety of applications which may be made, and I am aware that numerous other changes and modifications than those suggested above are included within the scope of my invention. For example, I have shown but one type of pump, yet there is an endless variety of pumps which can be applied to the purposes of my invention. The motor of the automobile itself may even serve as a pump either by utilization of gas pressure from the cylinders or of reduced pressure from the manifold. If reduced pressure is used, of course, the valves and balancing springs would have to be faced the other way and other changes made all of which will be obvious to those skilled in the art. Numerous other changes and modifications will occur at once to those skilled in the art who may read the above disclosure and the accompanying drawings.

I claim:

1. A power braking system for wheeled vehicles which comprises brake mechanism, fluid pressure motor means for operating the brake mechanism, a pump adapted to operate continuously while the vehicle is in motion, and having a connection with said motor means, a manually operable by-pass valve adapted to be opened to permit all of the fluid from said pump to escape, and movable through a series of settings in each of which it is adapted to accumulate a given pressure through the connection to said motor means, and pedal operated means adapted to operate said brake mechanism without any interference from said pump or any of the parts operatively connected thereto, in which by pass and connection form a Venturi tube whereby, so long as the by-pass is open, the passage of fluid from the pump will tend to reduce the pressure in the motor means, but upon closing of the valve will allow the back pressure to accumulate in the motor means.

2. An adjustable pressure control valve adapted for power braking systems and the like which comprises a movable abutment, a tubular conduit terminating a substantial distance from the fully extended position of the abutment, resilient means adapted to urge said abutment toward said conduit, a sleeve of substantially uniform cross-sectional area mounted over the end of said conduit in substantially fluid tight relation thereto, slidable thereon so as to close the gap between the conduit and said abutment and when closed balanced against fluid pressure held therein, whereby the sleeve may with slight force be made to follow the movement of said abutment when it is pressed back against the pressure of its resilient means by fluid pressure within said conduit and sleeve, and at any given position of said sleeve a fluid pressure will be maintained therein which balances the pressure of the resilient means against the abutment in that position.

3. In a motor vehicle the combination of a motor, an accelerator pedal for controlling the power applied by the motor in driving the vehicle, a power braking device having a manual control means balanced at all positions against the internal pressure of the controlled fluid so that the manual force required to hold it in position of adjustment is independent of said pressure, and an operating connection to said braking control means associated with the accelerator pedal so that the actuation of the braking device is effected by foot pressure thereupon distinctly different from the pressure upon the accelerator pedal by which the driving power of the motor is increased but with the foot in the same position.

4. A combination as defined in claim 3 in which the accelerator pedal is pivoted on a lever comprised in the means connecting said pedal to the braking control means and is connected to the motor so as to effect increased driving power by toe pressure on the forward end thereof, said lever being itself pivoted on an axis below and forward of the pivot of said pedal thereon, whereby the weight of a foot resting on said pedal as well as pressure on the forward end thereof will tend to hold the lever in the released brake position, while a forward movement of the entire pedal as well as direct heel pressure on the rear end thereof will result in moving said lever to a brake operating position.

5. A power operated braking system for motor vehicles with a pedal accelerator, which comprises brakes, a source of fluid pressure, fluid pressure motor means adapted to operate the brakes, a connection between said source of pressure and said motor means, a valve balanced against the internal fluid pressure so that it can be regulated with slight effort regardless of the pressure and adapted to control the pressure accumulated in said motor means, and means for regulating said valve, operatively associated with the accelerator pedal so that it will be operated to regulate the connection to the fluid pressure motor means for application of the brakes by a foot pressure upon said pedal distinctly different from that required to effect acceleration.

6. A power braking system for motor driven vehicles which comprises brakes, fluid pressure motor means adapted to operate the brakes, a pump adapted to generate pressure to operate said motor means, said pump being driven from the wheels of the vehicle whereby the rate of flow of fluid delivered from the pump will vary according to the speed of the vehicle, a connection from the pump to the brake operating motor means, a valve adapted to limit automatically according to the setting thereof the pressure exerted by the pump on the motor means, said valve being balanced against the internal pressure so that it can be adjusted with slight effort regardless of the pressure accumulated therein, and control means adapted by a continuous movement of the operator first to set said valve for complete release of pressure from the motor means and then to increase the driving power applied to the vehicle, and by a wholly distinct continuous movement of the operator, first, to diminish the driving power applied to the vehicle, and then to set the valve to apply increased pressure to said motor means.

7. A system as defined in claim 6, in which the connection from the pump to the motor means is open during normal power braking, and at least one of the three parts the pump, the motor means and their connections, is adapted to permit leakage, so that locking of the wheels will be substantially prevented.

8. A power braking system for motor driven vehicles which comprises brakes, fluid pressure motor means adapted to operate the brakes, a pump adapted to generate pressure to operate said motor means, a pressure reservoir adapted to accumulate pressure from the pump, an automatic pressure regulating valve adapted to limit the pressure accumulated in said reservoir, a connection from the reservoir to the brake operating motor means, a valve adapted to limit automatically according to the setting thereof the pressure admitted from the reservoir to the motor means, said valve being balanced against the pressure so that it can be adjusted with slight effort regardless of the pressure accumulated therein, and control means adapted by a continuous movement of the operator, first, to set said valves for complete release of pressure from the motor means and then to increase the driving power applied to the vehicle and by a wholly distinct continuous movement of the operator, first, to diminish the driving power applied to the vehicle, and then to set the valves to admit pressure from the reservoir to the brake operating motor means.

9. A power braking system for motor driven vehicles which comprises brakes, fluid pressure motor means for operating the brakes, a pump adapted to be driven continuously while the vehicle is in motion and to maintain thereby a substantial stream of fluid, a connection from the pump to the brake operating motor means, a normally open by-pass valve adapted when open to prevent accumulation of pressure in said brake operating motor means and when moved from the open position to throttle its by-pass whereby to apply the pressure of said stream to the brake operating motor means, and control means adapted by a continuous movement of the operator, first, to open said valve and then to increase the driving power applied to the vehicle, and by a wholly distinct continuous movement of the operator, first, to diminish the driving power applied to the vehicle and then to close said valve to apply the pressure of said stream to operation of the brakes.

10. A power braking system as defined in claim 9 in which the valve comprises a spring pressed abutment, a tubular conduit terminating a sufficient distance from the fully extended position of said abutment to permit passage of said conduit and adjustable longitudinally thereon so as to be extended against said abutment and close the gap between it and the end of the conduit and to follow said abutment to any desired extent as it is moved back against increasing spring pressure by fluid pressure built up within said conduit.

TRUMAN S. SAFFORD.